(12) United States Patent
Bayer (10) Patent No.: US 6,510,435 B2
(45) Date of Patent: Jan. 21, 2003

(54) DATABASE SYSTEM AND METHOD OF ORGANIZING AN N-DIMENSIONAL DATA SET

(76) Inventor: Rudolf Bayer, Riegseestrasse 12, D-82194 Gröbenzell (DE)

( * ) Notice: Subject to any disclaimer, the term of this patent is extended or adjusted under 35 U.S.C. 154(b) by 0 days.

(21) Appl. No.: 10/041,749

(22) Filed: Jan. 10, 2002

(65) Prior Publication Data

US 2002/0091704 A1 Jul. 11, 2002

Related U.S. Application Data

(63) Continuation of application No. 09/242,845, filed as application No. PCT/EP97/04520 on Aug. 20, 1997, now abandoned.

(30) Foreign Application Priority Data

Sep. 2, 1996 (DE) .......................... 196 35 429

(51) Int. Cl.⁷ .............................. G06F 17/30
(52) U.S. Cl. .................... 707/100; 707/101; 707/102; 707/103 R
(58) Field of Search ................. 707/100, 101, 707/102, 103 R (56) References Cited

U.S. PATENT DOCUMENTS

| | | | |
|---|---|---|---|
| 4,885,668 A | * 12/1989 | Crawfors | 364/413.22 |
| 4,885,688 A |   12/1989 | Crawford | 707/100 |
| 4,953,087 A | *  8/1990 | Crawford | 364/413.18 |
| 4,989,142 A | *  1/1991 | Crawford | 364/413.15 |
| 5,253,171 A | * 10/1993 | Hsiao et al. | 364/413.19 |
| 5,675,823 A | * 10/1997 | Hsiao | 395/800 |
| 5,721,910 A | *  2/1998 | Unger et al. | 707/100 |
| 5,799,300 A | *  8/1998 | Agrawal | 707/5 |
| 5,905,985 A | *  5/1999 | Malloy et al. | 707/100 |
| 5,943,668 A | *  8/1999 | Malloy et al. | 707/3 |
| 6,073,134 A | *  6/2000 | Shoup et al. | 707/100 |
| 6,108,657 A | *  8/2000 | Shoup et al. | 707/100 |
| 6,330,564 B1 | * 12/2001 | Hellerstein et al. | 707/101 |
| 6,434,557 B1 | *  8/2002 | Egilsson et al. | 707/5 |

OTHER PUBLICATIONS

Ramasamy et al., Array Evaluation of Multi–Dimensional Queries in object Relational Database Systems, Feb. 1998, Data Engineering, Proceedings., 14th International Conference, pp. 241–249.*

Penaloza et al., Parallel Algorithms for executing Join on Cube–Connected Multicomputers, IEEE. 1992, pp. 20–27.*

International Search Report, PCT/EP97/04520, dated Dec. 29, 1997.

Nakamura, Y. et al., "Data Structures for Multi–layer N–Dimensional Data Using Hierarchical Structure", $10^{th}$ International Conference on Pattern Recognition, vol. 2, Jun. 16, 1990, New Jersey, pp. 97–102.

(List continued on next page.)

*Primary Examiner*—Frantz Coby
(74) *Attorney, Agent, or Firm*—Shlesinger, Arkwright & Garvey LLP (57) ABSTRACT

The invention concerns a database system and method of organizing a multidimensional data stock. The database system comprises a computing arrangement, a main memory and an in particular peripheral memory arrangement. In order to index and store the data stock present in multidimensional cube on memory pages of the peripheral memory device with a given storage capacity, the multidimensional cube is divided iteratively in all dimensions into sub-cubes until successive sub-cubes can be combined to form regions each containing an amount of data objects which can be stored on one of the memory pages with a given storage capacity. The method according to the invention for organizing, insert, deleting and searching for data objects is designed as a dynamic data structure known as an "FB tree", which improves access times and is therefore suitable for use in on-line applications.

18 Claims, 6 Drawing Sheets

OTHER PUBLICATIONS

Yutaka Ohsawa et al., "A New Tree Type Data Structure with Homogeneous Nodes Suitable for a Very Large Spatial Database", Proceedings of the International Conference on Data Engineering, Los Angeles, Feb. 5–9, 1990, No. Conf. 6, Feb. 5, 1990, Institute of Electrical and Electronics Engineers, pp. 296–303.

Teraoka, T. et al., "The MP–Tree: A Data Structure for Spatio–Temporal Data", Proceedings of the Annual International Phoenix Conference on Computers and Communications, Scottsdale, Mar. 28–31, 1995, No. Conf. 14, Mar. 28, 1995, Institute of Electrical and Electronics Engineers, pp. 326–333, XP000548494.

Zhao et al., Array Based Evaluation of Multi Dimensional Queries in Object Relational Database Systems, Feb. 1998, Data Engineering Proceedings, 14th International Conference IEEE, pp. 241–249.

* cited by examiner

DATABASE SYSTEM AND METHOD OF ORGANIZING AN N-DIMENSIONAL DATA SET

RELATED APPLICATION

This continuation application claims the priority benefit of application Ser. No. 09/242,845, filed Jul. 7, 1999,now abandoned which is a national stage application of international application number PCT/EP97/04520, filed Aug. 20, 1997, which claims the priority benefit of German Application No. 196 35 429.3, filed Sep. 2, 1996.

FIELD OF THE INVENTION

The present invention relates to a database system and a method of organizing a data set existing in an n-dimensional cube with n>1.

BACKGROUND OF THE INVENTION

The so-called B tree (or also B* tree or prefix B tree) is known as the data structure to organize extensive one-dimensional volumes of data in mass memories such as magnetic disk memories. The data structure of the B tree over that of a simple search tree has the advantage that lower search times are required for data access. The resulting search time to locate certain data involves at least $\log_2(n)$ steps with a simple search tree with n nodes. With a search tree with 1,000,000 nodes, $\log_2(1,000,000) \approx 20$ disk access operations must therefore be expected. Assuming a mean access figure of 0.1 sec., the search of one node will require 2 secs. This value is too large in practice. With the data structure of the B tree, the number of disk access operations is reduced by transferring not one single node, but a whole segment of the magnetic disk allocated to a node to the main memory and searching within this segment. If, for example, the B tree is divided into areas of seven nodes each and if such an area is transferred into the main memory with each disk access operation, the number of disk access operations for the search of a node is reduced from a maximum of 6 to a maximum of 2. With 1,000,000 nodes, only $\log_8(1,000,000)=7$ access operations are therefore required. In practice, the search tree is normally divided into partial areas with a size of $2^8-1$ to $2^{10}-1$ nodes. With an area size of 255 nodes, $\log_6(1\ m)>2.5$ disk access operations are required for the search of a node in a tree with 1,000,000 nodes so that the search for a given value takes only around 0.3 secs. The search time within a partial area with 255 nodes located in the main memory can be neglected in comparison with the disk access operation. The B tree is a vertically balanced tree in which all leaves are located at the same level.

The so-called dd trees are known from K. Mehlhorn: *Multidimensional searching and computational geometry*, Springer, Heidelberg 1984, to organize a multidimensional data set. With the dd trees, three types of queries can be performed in principle, namely point queries, area queries and queries where some intervals are given as (-infinite, +infinite). However, the data structure of a dd tree only allows fast access for point queries, as then only one path in the tree needs to be searched. With the other queries, it is possible that the whole tree has to be searched. Moreover, dd trees are static, i.e. the whole object volume to be organized must already be known before the dd tree can be set up. However, in most applications in practice, the object volume is dynamic, i.e. it must be possible for objects to be inserted into or deleted from the tree in any order and at any time without the whole tree having to be set up again from the start. Furthermore, dd trees are only suitable for main memory applications, but not for peripheral memories which are needed to store very large volumes of data.

In *"The Grid File"* by Nievergelt et al, ACM TODS, Vol 9, No. 1, March 1984, so-called grid files are described to organize multidimensional data where queries for points and areas are performed on the basis of an index structure, the so-called grid.

Although this data organization allows a fast search for point and area queries, it is a static procedure so that the total index structure has to be completely reorganized regularly when data objects are inserted or deleted dynamically. This method is thus not suitable for many applications, in particular not for online applications.

So-called R trees are known as the data structure to organize multidimensional data from A. Guttmann: *A dynamic index structure for spatial searching, Proceedings ACM SIGMOD, Intl. Conference on Management of Data*, 1984, pages 47–57. These trees, which are used mainly for so-called geo-databases, are vertically balanced like B trees and also allow the dynamic insertion and deletion of objects. However, no fast access times are guaranteed for the response to queries, because under certain circumstances any number of paths in the corresponding tree, in extreme cases even the whole tree, have to be searched to answer a query. As a result, these R trees are not suitable for most online applications.

From Y. Nakamura et al: *Data structures for multi-layer n-dimensional data using hierarchical structure*, 10th International Conference on pattern recognition, Volume 2, Jun. 16, 1990, IEEE Computer Society Press, New Jersey, USA, pages 97–102, a splitting method is known for a multidimensional rectangular space. In the known method, a given multidimensional rectangular space is split into two sub-spaces as soon as the number of data points in the space exceed the capacity of one data page. The splitting of the starting space is performed by cutting out a partial rectangular. The spatial structures newly created by this splitting, namely a cut-out rectangular and the rest of the starting space are structured as layers in a BD tree with the tree structure being created depending on the sequence of the cutting out of the individual partial spaces in the event of multiple cut-out partial spaces. The BD tree structure created in such a way represents a binary tree in which it is determined at each branch node which rectangle will be cut out as the new BD partial space. This successive cutting out has the consequence that the BD tree grows downwards so that in the insertion, deletion and searching of data points, i.e. data objects, in the total space a path has to be passed through from the tree root to a leaf (branch end). Here, it is necessary to check at every intermediate node whether a point being searched for is located in the associated cut-out partial space or in the complementary rest space. The search effort can thus grow proportionally with the size of the data set, which leads to a poor efficiency behavior with large and very large data sets.

The most widespread method in practice today to organize a multidimensional data set is based on the original one-dimensional B trees, with one B tree in each case being used for each dimension of the starting data set so that area queries in an n-dimensional data set are supported by n B trees. In an area query, all objects are thus obtained from the peripheral memory for each dimension whose values are located in the interval specified in the query for this dimension. These data objects form the hit number in the corresponding dimension. To determine the desired answer number, a mean number of the hit numbers of all dimensions must be computed, which will normally first require the sorting of these numbers. When a data object is inserted or deleted, n B trees must also be searched and modified correspondingly.

OBJECTS AND SUMMARY OF THE INVENTION

On this basis, the object of the invention is to provide a database system and a method of organizing an n-dimensional data set which, thanks to improved access times, is, in particular, suited for use in online applications and which allows a dynamic insertion and deletion of data objects.

In accordance with the invention a database system and a method to organize an n-dimensional data set is proposed to solve this object. The database system in accordance with the invention comprises a computing apparatus, a main memory and a memory device, which is in particular a peripheral memory device. The basic idea of the invention is to place a multidimensional data set to be organized in a multidimensional cube and to perform a repeated iterative division of the multidimensional cube in all dimensions into sub-cubes to index and store this data set by means of the computing apparatus. The division is repeated so often here until successive sub-cubes can be combined into regions which each contain a set of data objects which can be stored on one of the memory pages of given storage capacity of the in particular peripheral memory device. As the regions of successive sub-cubes are combined, the regions are also successive so that they form a one-dimensional structure. Thus, in accordance with the invention, when data objects are inserted or deleted, only the modification of one single data structure, for example, a tree, is necessary.

In one embodiment of the invention, the storing of the data objects of a region on one memory page of given storage capacity is performed while allocating a pointer to the memory page and an address defining the region borders. Thus, each region to be stored has allocated to it clear addresses defining the region borders and a pointer pointing to the memory page on which the corresponding region is stored. In this way, the locating of the region and the data objects contained in the region is simplified in organizational routines such as the answering of queries and the deletion or insertion of data objects.

In another embodiment of the invention, the storage of the pointer and the address is made in a B tree, B* tree or prefix B tree so that in an address search, a simple search, which can be performed quickly, can be made in a B tree to identify the required region through the pointer allocated to the address and pointing to the memory page of the required region.

In another embodiment of the invention, the storage of the data objects themselves is made in the leaf pages of the B tree, B* tree or prefix B tree.

In an advantageous embodiment of the invention, the address defining the region borders consists of data on the last of the sub-cubes forming the region. A database system has proved to be very advantageous in which the address comprises data on the number of sub-cubes contained in each division stage in the region. A region is thus clearly defined if the last sub-cube fully contained in the region is also clearly defined by the address data. The start of the region is here given by the address data on the last of the sub-cubes forming the previous region.

In an embodiment of the method in accordance with the invention, a method is proposed. With the method in accordance with the invention, to index and store a multidimensional data set, said data set is placed in an n-dimensional cube with n>1. This cube forms in its totality a starting region containing all data objects of the data set. If the number of existing data objects is smaller than or equal to that of the number of data objects corresponding to the given storage capacity of a memory page, the starting region is stored on one memory page. Otherwise, the starting region is split along a splitting address, with the splitting address being chosen so that two new partial regions are generated roughly along the data center. Each of these partial regions is then treated in the same way as before with the starting region, i.e. the number of data objects contained in the partial region in each case is determined and compared with the number corresponding to the given storage capacity of a memory page. If the data set is not larger than the number corresponding to that of the given storage capacity, then the corresponding region is stored on one memory page, otherwise it is again split along the data center and the process begins afresh.

Advantageously, the storage of the data objects of a region or partial region is made in parallel with the storage of an address allocated to the corresponding region and of a pointer allocated to the address and pointing to the memory page on which the stored data objects are contained. The address to be stored in parallel can advantageously be the splitting address giving the end of the one and the beginning of the other region.

In an embodiment of the invention, the storage of the address and the pointer is made in a B tree, B* tree or prefix B tree, with in each case regions being defined by successive addresses, the data objects of which regions are each stored on one memory page of given storage capacity.

In an embodiment of the method in accordance with the invention, a method is proposed for the insertion of data objects. Advantageously, the stored n-dimensional data set is a data set indexed and stored in accordance with the method in accordance with the invention described above. In accordance with the invention, a region of the n-dimensional data set containing the data object and the memory page on which this region is stored is determined on the basis of the coordinates of the data object to be inserted. Subsequently, the data objects stored on this memory page are counted. If the number of data objects stored is smaller than the number corresponding to the given storage capacity of the memory page, the data object to be inserted is also stored on this memory page. Otherwise a splitting address is selected for the region stored on this memory page in such a way that by splitting the region along this splitting address, a first and second partial region are generated in which in each case less than around half the number of data objects corresponding to the given memory capacity is contained. Then, the data object to be inserted is inserted in that partial region in which the coordinates of the data object lie whereupon the first and the second partial regions are stored on one memory page each.

In accordance with the invention, the dynamic insertion of data objects in the given data structure is thus possible without the totality of the data structure having to be modified or created anew. If as a result of the insertion of the new data object, the region in which the insertion was made can no longer be stored on one memory page, this region is split into two further regions, whereby only the corresponding region to be split into two further regions or the partial regions newly created by the splitting have to be modified and stored anew.

Advantageously, the locating of the memory page is made in the method in accordance with the invention for the insertion of data objects by means of addresses and pointers stored in a B tree, B* tree or prefix B tree and allocated to the memory pages. In this way, the locating of the desired memory page can be particularly simple and fast. Accordingly, it has proved to be advantageous if the storing of the newly created partial regions is made while replacing the prior pointer and the address of the split region by in each case the addresses and pointers allocated to the first and second partial regions. Here, for example, the splitting address can be used as the limiting address for the first partial region and the limiting address of the split region can be used for the second partial region.

It has proven to be particularly advantageous if the storage of the address and the pointer is performed in a B tree, B* tree or prefix B tree, with regions being defined in each case by successive addresses, the data objects of which regions are stored in each case on a memory page of given storage capacity.

In an embodiment of the method in accordance with the invention, a method is proposed for the deletion of data objects. Accordingly, on the basis of the coordinates of the data object to be deleted, that region of the n-dimensional data set containing the data object and the memory page on which this region is stored is determined and the object to be deleted is deleted from this memory page. Subsequently, the number of the data objects stored on this memory page is determined and the region is merged with one of its two neighboring regions if the number of stored data objects is smaller than roughly half the number corresponding to the given storage capacity of the memory page. Then, in turn, the number of the data objects present in the region newly created by the merger is determined. If this number is not greater than the number corresponding to the given storage capacity of a memory page, the region is stored on one memory page, otherwise a splitting address is selected for the region in such a way that by splitting along the splitting address, a first partial region and a second partial region are generated which each contain around half of the data objects contained in the region to be split, whereupon the partial regions created are stored on one memory page each.

Advantageously, in this method, too, the locating of the memory page is made by means of addresses and pointers stored in a B tree, B* tree or prefix B tree and allocated to the memory pages.

In an embodiment of the method in accordance with the invention, a method is proposed for the performance of a data query on the basis of a given n-dimensional query area.

Accordingly, the coordinates of the lowest and the highest point of intersection of the given query area with the n-dimensional data set are determined as is that region in which the lowest point of intersection lies. Then, the memory page is located on which the determined region is stored and all data objects stored on this memory page which form a set of intersection with the query area are determined. The data objects determined are then output. Then, the sub-cube of the determined region which is the last in the sequence is determined, which sub-cube intersects the query area, and the data query is ended if the highest point of intersection of the query area is in this sub-cube. Otherwise, the next sub-cube of the same plane and of the same next higher cube is determined which intersects the query area, and the coordinates of the lowest point of intersection of the query area with the newly determined sub-cube are determined, whereupon the process is continued with the determining of that region in which the lowest point of intersection lies if a sub-cube was determined. Otherwise, the next sub-cube of the plane of the next higher cube is determined which intersects the query area and the determination of the next sub-cube of the same plane and of the same next higher cube intersecting the query area is performed with the sub-cubes of the newly determined cube. If no sub-cube of the plane of the next higher cube is determined, the next higher cube assumes the role of the sub-cube and then the next sub-cube of this plane and of the same next higher cube which intersects the query area is determined. Thus, in accordance with the invention, the sub-cubes of all relevant next higher cubes and in turn, their next higher cubes are examined successively with respect to intersection sets of data objects with the query area.

BRIEF DESCRIPTION OF THE DRAWINGS

The invention is shown in the drawings by means of embodiments and is described below in detail by reference to the drawings.

FIGS. 3.1 to 3.4 serve to illustrate the address allocation of sub-cubes in a two-dimensional cube.

FIGS. 6.1 and 6.2 illustrate the modification and storage of addresses and pointers in the splitting of a region for the insertion of data objects.

DETAILED DESCRIPTION OF THE PREFERRED EMBODIMENTS

To organize an n-dimensional database, it is assumed in accordance with the invention that the data space in which the data objects to be organized are located is an n-dimensional cube or is enclosed by such a cube, with n being any natural number where n>1. This cube is called an enclosing cube.

Figure 1:
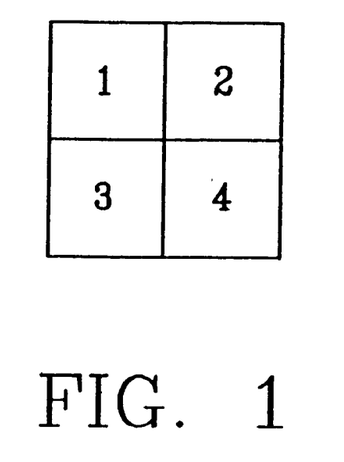
FIG. 1 shows a two-dimensional cube in which there lies a two-dimensional data set, not shown in any detail, and which is divided into four sub-cubes of equal size.

The enclosing cube is divided into $2^n$ sub-cubes of equal size by halving each dimension of the cube. These sub-cubes are numbered in an order to be determined from 1 to $2^n$. FIG. 1 shows a two-dimensional cube, that is a square, for the case of a two-dimensional data space, divided into $2^2=4$ sub-cubes of equal size which are numbered beginning at the top left from left to right and from top to bottom.

Figure 2:
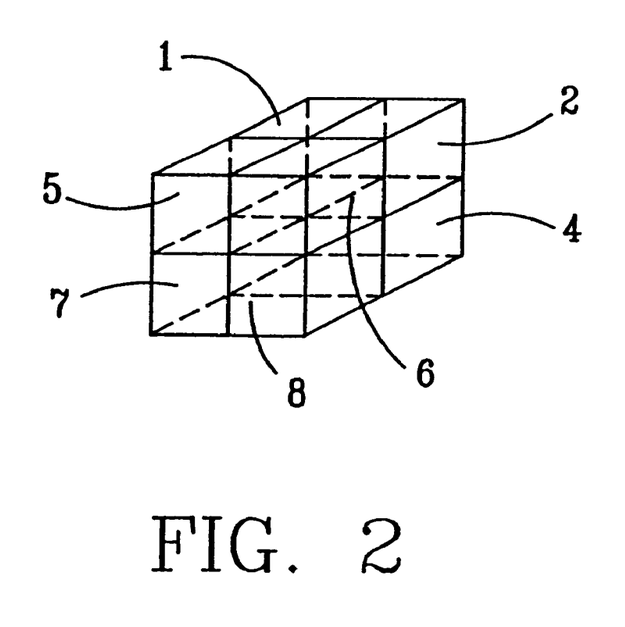
FIG. 2 shows a three-dimensional cube in which there lies a three-dimensional data set, not shown in any detail, and which is divided into eight sub-cubes of equal size.

FIG. 2 shows an enclosing cube of a three-dimensional data space with $2^3=8$ sub-cubes of equal size which are also numbered, in this case beginning at the back left from left to right, from top to bottom and from back to front. Accordingly, the sub-cube with the number 3 is positioned at the back left in the drawing of FIG. 2 and is not visible.

Each of the sub-cubes of the starting cube shown in FIGS. 1 and 2 can be divided in turn using the same method into $2^n$ sub-cubes with a numbering from 1 to $2^n$, and this division can be continued as often as desired recursively (or iteratively). In the practical application of the invention, the dividing process is repeated until regions can be formed by sub-cubes lying together, the number of data objects of which regions can be stored on a memory page of given storage capacity.

If the starting cube has a side length l, then after s divisions, the sub-cubes have a side length of $(\frac{1}{2}^s)*l$. To identify the cubes, these are ordered in accordance with the corresponding division in a stage s. Accordingly, the starting cube has the stage 0, the sub-cubes shown in FIGS. 1 and 2 have the stage 1, etc.

An area A is now a special sub-space of the starting cube which is created as follows:

At stage 1, the first $a_1$ sub-cubes belong fully to the area a, where $0<=a_1<2^n$;

At stage 2, the first $a_2$ sub-cubes of the sub-cube $a_1+1$ of the first stage belong to area A;

And so on, up to stage i, where the first $a_i$ sub-cubes of the sub-cube $a_{i-1}+1$ of the ith stage belong to area A.

An area A defined in this way is clearly described by the sequence of numbers $a_1\ a_2\ a_3\ \ldots\ a_i$. This sequence of numbers is called the clear address alpha(A) of area A. This is illustrated by means of FIGS. 3.1 to 3.4 for the two-dimensional case, that is n=2.

Figure 31:
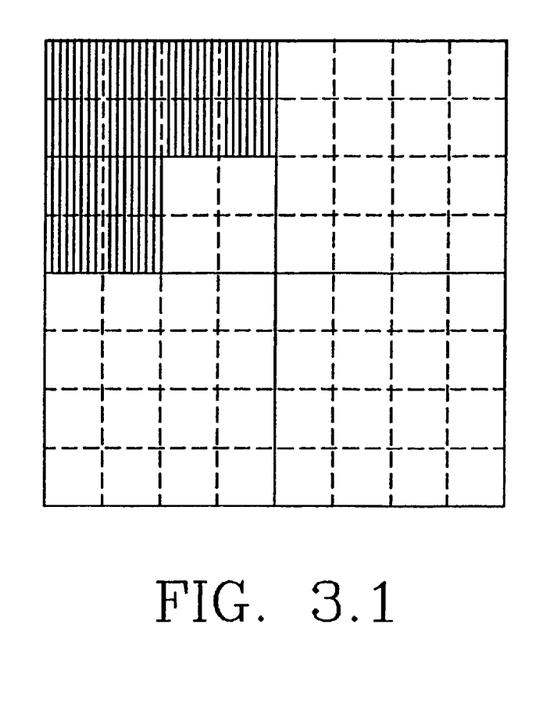

FIG. 3.1 shows a two-dimensional cube divided into four sub-cubes of equal size which are in turn divided twice. The gray hatched area in FIG. 3.1 forms an area A which has the address alpha(A)=03, because the first two-dimensional sub-cube at stage 1 does not fully belong to A, which is indicated by the number 0 at the first position of the address. Of this sub-cube, however, then the first 3 sub-cubes of stage 2 belong to A, which is indicated by the number 3 at the second position of the address.

Figure 32:
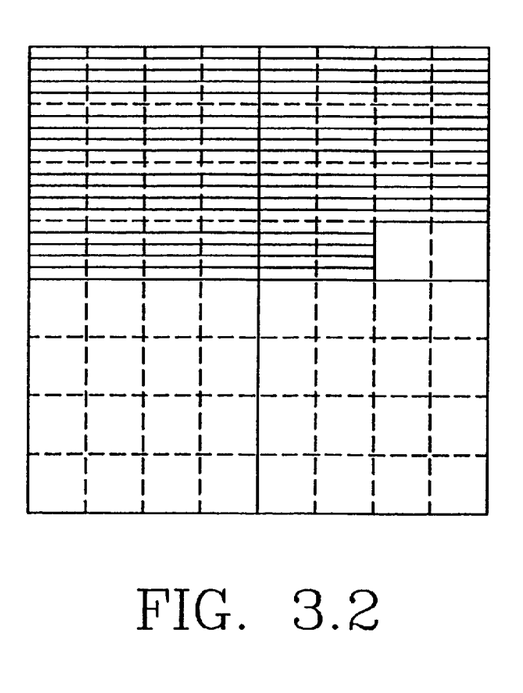

FIG. 3.2 shows the cube of FIG. 3.1 with another gray hatched area which forms the area B. This has the address alpha(B)=132, as the first sub-cube is completely contained in the area B (number 1 at first position); however, of the second sub-cube only the first three sub-cubes of stage 2 are contained (number 3 at second position) and of the fourth sub-cube of stage 2 only the first two sub-cubes of stage 3 are contained (number 2 at third position).

Figure 33:
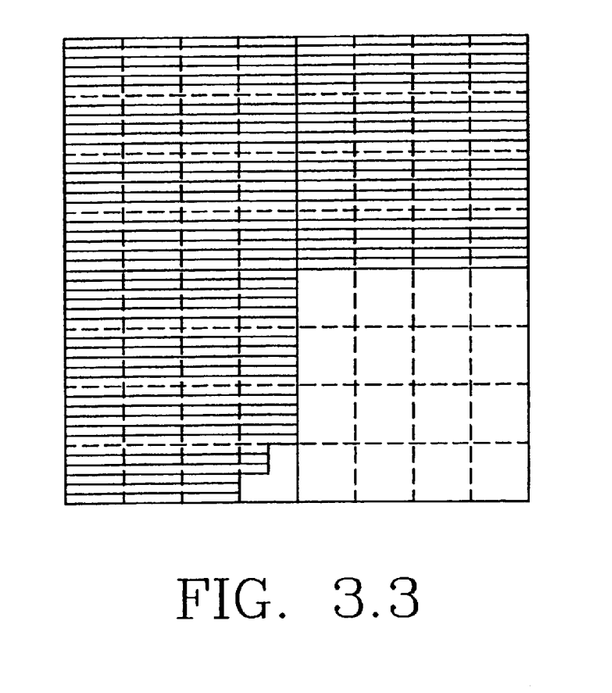

FIG. 3.3 again shows the two-dimensional sub-cube of FIGS. 3.1 and 3.2 with a different gray hatched area which forms the area C which has the address alpha(C)=2331.

Figure 34:
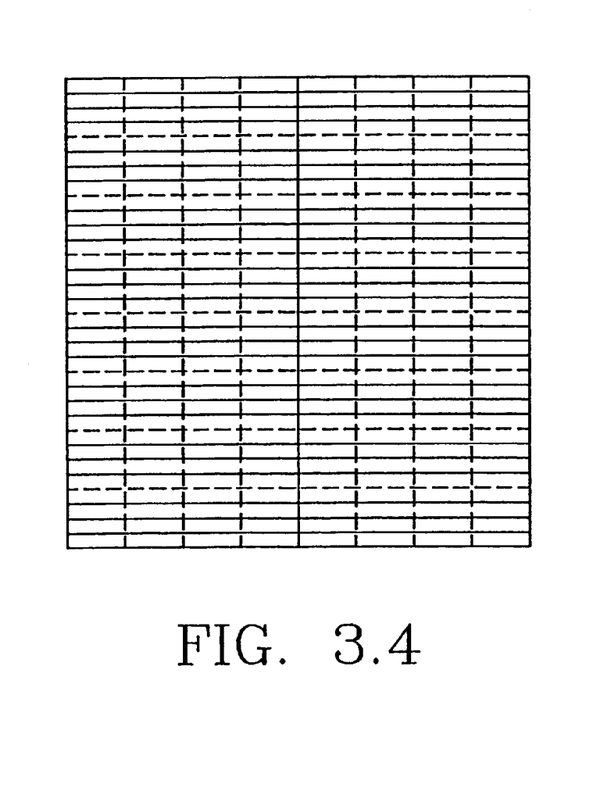

In FIG. 3.4, the total (gray hatched) two-dimensional cube forms an area D with the address alpha(D)=4. This special case is allocated, for example, epsilon as the address (alpha (D)=epsilon).

Figure 4:
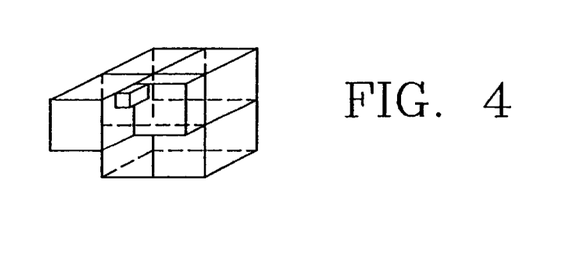
FIG. 4 serves to illustrate the address allocation of sub-cubes in a three-dimensional cube.

To further illustrate the address allocation, in FIG. 4 a section forming an area E of a three-dimensional data set cube is shown which has the address alpha(E)=541.

The sub-cubes which still belong to an area become smaller exponentially by the factor $2^n$ at each division stage. In this way, the addresses remain very short. In one implementation, for example, of a map of the state of Bavaria, an area whose smallest sub-cube is 8×8 meters in size has an address of a length of around 32 bits.

The areas described are ordered in strictly linear fashion according to their being contained according to set theory: for an area A, which is contained spatially in an area B, we can write:

A contained in B

Furthermore, the addresses belonging to the areas are ordered lexicographically like words by alphabetical order. If, for example, an address $\alpha$ is smaller than the address $\beta$, then it can be defined as $\alpha<<\beta$.

Thus, for example,

132<<2331 and 2331<<32 applies.

The areas and addresses described above are now organized in such a way that the following relationship applies:

Area ($\alpha$) contained in area ($\beta$) precisely when $\alpha<<\beta$.

Since the areas are, as explained, ordered in a linear fashion, the difference can always be formed between the larger and the smaller area. If the address $\alpha$ is smaller than the address $\beta$, that is $\alpha<<\beta$, then a region reg ($\alpha,\beta$) is defined as the difference between area($\beta$) and area($\alpha$). This is equivalent in meaning to:

reg($\alpha,\beta$)=area($\beta$)−area($\alpha$)

Figure 7:
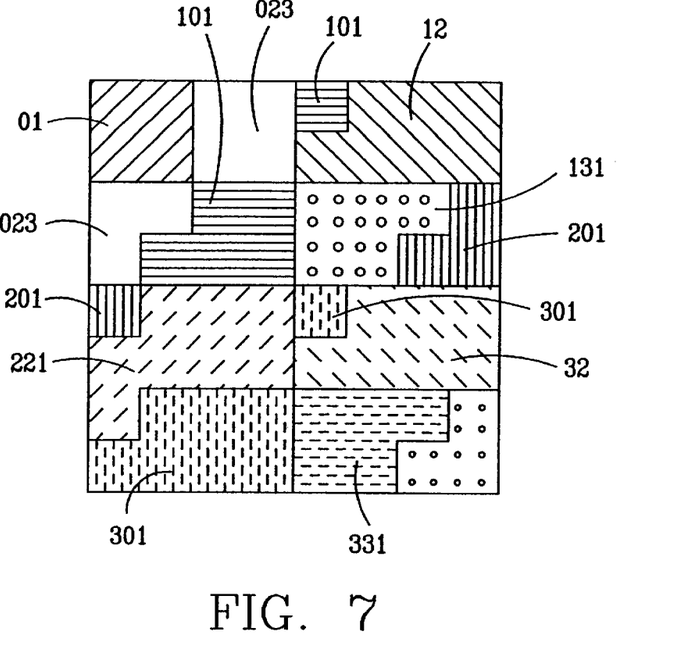
FIG. 7 shows a two-dimensional cube divided into a plurality of regions with a data set not shown in any detail.

Regions have the property that they are clustered in very special patterns in the given n-dimensional space. FIG. 7 shows an example of such a clustering of a two-dimensional cube into multiple regions. Thus, the first region, defined as 01, exactly comprises the first sub-cube of the first sub-cube of the total cube. The second region, defined as 023, comprises the complete second sub-cube of the first sub-cube and the three first sub-cubes of the following third sub-cube. In FIG. 7, this region is shown in white. The region thus begins after the sub-cube with the address 01 and ends with the sub-cube with the address 023. By giving these two addresses, the rule explained above, namely reg(01, 023)=area (023)−area (01), is clearly defined.

The other regions drawn in the sub-cube of FIG. 7 are formed accordingly using the addresses given in the individual regions. Here, it is very possible that sub-cubes which form a connected region appear as not connected due to the method of numbering and presentation. This is precisely the case when a region is made up of sub-cubes in which a jump exists in the numbering from 2 to 3 or from 4 to 1. In FIG. 7, for example, this is the case in the region reg(01,023) drawn in white and already explained as there the sub-cube 02 and parts of the sub-cube 03 form a region, but due to the change in numbering from 02 to 03 there is a jump in the representation. This may also be the case, for instance, in the region reg(023, 101) adjacent to region reg(01,023), where the former extends from the sub-cube 04 to the sub-cube 11.

The described regions of an n-dimensional cube play a central role in the storage of objects in an, in particular, peripheral computer memory. These memories are divided into so-called pages whose contents are collected in an input/output procedure with a memory access operation into the random access memory of the computer or are written back into the peripheral computer memory from there. The regions are designed in the following so that the data objects to be stored which lie in one region or intersect it can be stored on one page of the peripheral computer memory. The memory page belonging to region reg($\alpha$, $\beta$) can, for example, be defined as page($\alpha,\beta$).

In all computer applications, the resolution of the space, i.e. the smallest still distinguishable spatial elements, plays an essential role. In the two-dimensional case, they are also called pixels (from picture element) and in the n-dimensional case voxels (from volume elements). The number of elements which can be distinguished per dimension can be termed pix. If the Cartesian coordinates of a point in n-dimensional space are $(x_1, x_2, \ldots x_n)$, then the equation applies $0<=x_i<pix$ for $i=1, 2, \ldots, n$.

The area whose last sub-cube just reaches the point $(x_1, x_2, \ldots x_n)$ is clearly defined and has a certain address which can be computed easily and clearly from $(x_1, x_2, \ldots x_n)$. We identify this function or computation rule with alpha$(x_1, x_2, \ldots x_n)$. Vice versa, from the address a of an area, the Cartesian coordinates of the last point can be computed which still belongs to this area. We identify this function by cart$(\alpha)$. alpha and cart are inverse functions to each other, i.e. the following applies:

cart (alpha $(x_{1, x2}, \ldots x_{n))=(x1}, x_2, \ldots x_n)$ alpha (cart $(\alpha))=\alpha$ As described, in the data organization in accordance with the invention, an n-dimensional space is partitioned fully into regions in the form of a cube by a set of areas, with the addresses of the areas being sorted lexicographically and a region being defined just by the difference between two successive areas or by their addresses. The smallest possible area is the smallest pixel of the "data universe" and has the address 00 . . . 01. This address is identified here by sigma. The biggest address is 4 in the two-dimensional case and $2^n$ in the n-dimensional case and, as described above, is identified here by epsilon.

Figure 5:
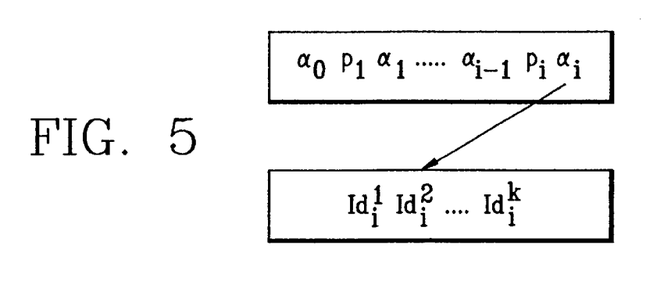
FIG. 5 illustrates the storage of addresses and pointers.

The sorted addresses of the areas are stored in accordance with the invention in a conventional B tree, B* tree or prefix B tree. Advantageously, in the B tree a pointer (also termed a reference) is stored between two successive addresses $\alpha_{i-1}$ and $\alpha_i$, which exactly define the region reg$(\alpha_{i-1}, \alpha_i)$, on that page of the peripheral memory on which the data objects of the region reg$(\alpha_{i-1}, \alpha_i)$ are stored. This pointer is identified with $p_i$.

FIG. 5 illustrates such a storage procedure, where in the plane at the top in the representation of FIG. 5 alternately an address and a pointer are stored in each case. By means of the two addresses each allocated to a pointer, the borders of a region are given to whose data objects the pointer positioned between the two addresses refers. Thus, in the example of FIG. 5, the pointer $p_i$ points by means of the arrow drawn in to a memory page in which the data objects (here the identifiers of the data objects) of the region reg$(a_{i-1}, \alpha_i)$ formed by the addresses to the left and right of the pointer in each case are located.

The case described here relates to a B* tree for addresses in which tree the pointer $p_i$ points to so-called leaf pages. The data objects themselves or their identifiers are located on these leaf pages, with—in the latter case—the data objects themselves being restored on other pages and being able to be found in the peripheral memory by means of their identifiers.

The data structure in accordance with the invention described above is defined in the following as an FB tree.

In the following, the method in accordance with the invention is described for the example of the organization of point objects in n-dimensional space. A point object P is given by its Cartesian coordinates $(x_i, x_2, \ldots x_n)$. From this, the address $\beta$=alpha $(x_i, x_2, \ldots x_n)$ is computed. The point P is in the clearly defined region reg$(a_{j-1}, \alpha_j)$ with the property that $\alpha_{j-1} << \beta << \alpha_j$.

This region is determined by a tree search in the FB tree where the reference $p_j$ to the page page $(\alpha_{j-1}, \alpha_j)$ is found. The point P, i.e. its identifier together with its coordinates $(x_1, x_2, \ldots x_n)$, is then stored on the page page $(\alpha_{j-1}, \alpha_j)$ of the peripheral memory. Alternatively, only the identifier of the point can be stored on page $(\alpha_{j-1}, \alpha_j)$ and the point itself, i.e. its coordinates and other information about it, is restored again on another page.

The pages of the peripheral memory have only a certain given storage capacity and can therefore only accept a certain number M of objects. As soon as further objects are to be inserted into a region, but the page belonging to the region cannot accept any more objects, the contents of the page have to be divided onto two pages and the region must accordingly be split into two regions.

Below, we first describe the splitting of the region: let us assume the region reg$(\alpha_{j-1}, \alpha_j)$ and the associated page page $(\alpha_{j-1}, \alpha_j)$. From the definition of a region, it then follows that: $\alpha_{j-1} << \alpha_j$. Now a splitting address $\beta$ is selected with the property that $\beta$ is between the two area addresses $\alpha_{j-1}$ and $\alpha_j$ and splits the region reg$(\alpha_{j-1}, \alpha_j)$ roughly in the middle, i.e. that around half of the objects are contained in the region reg$(\alpha_{j-1}, \beta)$ and the other half in the region $(\beta, \alpha_j)$. Then the two regions reg$(\alpha_{j-1}, \beta)$ and reg$(\beta, \alpha_j)$ each contain less than ½M+eps objects, where eps is a small given number and could, for example, be around ¹⁄₁₀ of M.

Subsequently, the objects are divided from the page page$(\alpha_{j-1}, \alpha_j)$ onto the two pages page $(\alpha_{j-1}, \beta)$ and page $(\beta, \alpha_j)$, where one of the two pages can be identical to the original page page$(\alpha_{j-1}, \alpha_j)$.

Figure 61:
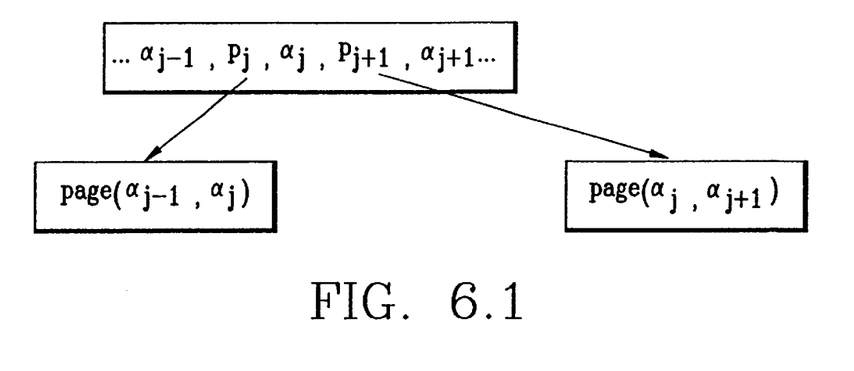
Figure 62:
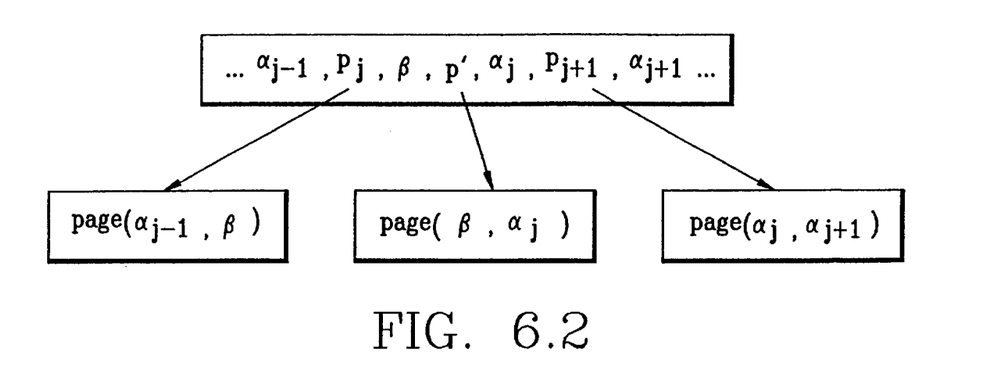

When the region reg$(\alpha_{j1}, \alpha_j)$ is split, the modification of the FB tree shown in FIGS. 6.1 and 6.2 is performed. FIG. 6.1 shows the starting structure of the FB tree with a plane (at the top in the drawing representation) which contains the stored addresses $\alpha_{j-1}, \alpha_j$ and $\alpha_{j+1}$ and the pointers $p_j$ and $p_{j+1}$ between these addresses. Here, the pointer $p_j$ points to the page page$(\alpha_{j-1}, \alpha_j)$ and the pointer $p_{j+1}$ to the page page$(\alpha_j, \alpha_{j+1})$. After the splitting of the page page$(\alpha_{j-1}, \alpha_j)$, the tree structure visible from FIG. 6.2 exists, with there having been inserted in the next higher plane in the drawing representation between the pointer $p_j$ and the address $\alpha_j$ the address $\beta$ corresponding to the splitting address and the pointer p' referring to the new memory page page$(\beta, \alpha_j)$. The previous pointer $p_j$ now refers to the amended sheet page $(\alpha_{j-1}, \beta)$ and the pointer $p_{j+1}$ which is unchanged, refers to the also unchanged page page$(\alpha_j, \alpha_{j+1})$.

Due to the insertion of $\beta$ and p' into the next higher node, it may become necessary also to split the next higher page, if too many address and pointer data exist due to this insertion. However, these splitting procedures then run exactly as usual in the B trees known in the prior art. Due to these repeated splitting procedures on the insertion of objects into the existing data universe, the FB trees are created which have a growth very similar to that of the known B trees.

For the further explanation of the method, in the following the deletion of data objects from the existing data universe and the adaptation of the regions after the performance of the deletion is described.

If a point object $(x_1, x_2, \ldots x_n)$ has to be deleted again, first—as in the insertion procedure—the region in which the point is located and the associated memory page are determined. The point is deleted from the page and so also disappears from the region. If the number of the objects in the page falls as a result to less than ½ M−eps, then the region is merged with one of the two neighboring regions. If the region thus created contains too many objects, it is again split at the middle as already described above.

As an example, the region reg$(\alpha_{i-1}, \alpha_i)$ could, if it does not contain enough objects after a deletion operation, be merged with the region reg$(\alpha_i, \alpha_{i+1})$ to form region reg$(\alpha_{i-1}, \alpha_{i+1})$. If reg$(\alpha_{i-1}, \alpha_i)$ then contains too many objects, it is split again into reg$(\alpha_{i-1}, \beta)$ and reg$(\beta, \alpha_{i+1})$ where naturally $\beta$ is chosen as suitable and $\alpha_{i-1} << \beta << \alpha_{i+1}$ must apply, with in addition $\alpha_{i-1} << \beta$ so that more objects are contained in the first region. When an object is deleted from the region reg$(\alpha_{i-1}, \alpha_i)$ the following 3 cases thus result:

Case 1: reg($\alpha_{i-1}$, $\alpha_i$) still has at least ½ M–eps objects after the deletion. Then the region and the associated page remain in existence.

Case 2: reg($\alpha_{i-1}$, $\alpha_i$) can be merged with one of the two neighboring regions reg($\alpha_{i-2}$, $\alpha_{i-1}$) or reg($\alpha_i$, $\alpha_{i+1}$) to the new region reg($\alpha_{i-2}$, $\alpha_i$) or reg($\alpha_{i-1}$, $\alpha_{i+1}$).

Case 3: The region reg($\alpha_{i-1}$, $\alpha_i$) is first merged with a neighboring region as in Case 2, but must then be split again, and the two regions reg($\alpha_{i-2}$, $\beta$) and reg($\beta$, $\alpha_i$) or reg($\alpha_{i-1}$, $\beta$) and reg($\beta$, $\alpha_{i+1}$) are created.

By means of such deletion operations, neighboring regions can at some time be fully merged again so that the FB tree shrinks again and shows exactly the reverse behavior as in the splitting of regions and pages and in the growth caused thereby. If, finally, all objects have been deleted from the universe, then the FB tree has become empty again.

For the further explanation of the method in accordance with the invention, the response to point queries is explained below.

In a point query, the Cartesian coordinates ($y_1 \ldots, y_n$) are given for the point P to be located for which additional information such as height or temperature or stock exchange value or similar should then be determined. This additional information is stored with the point object itself.

First, the address pp of the point P is computed from the Cartesian coordinates ($y_1, \ldots, y_n$). The point is in the clearly determined region reg($\alpha_{i-1}$, $a_i$) with the property $\alpha_{i-1} << pp << \alpha_i$.

This region and the page page ($\alpha_{i-1}$, $\alpha_i$) belonging to this region is found and retrieved by means of a search in the FB tree and by means of the pointer $p_i$ stored there. On the page reg($\alpha_{i-1}$, $\alpha_i$), there is then located the complete, desired information on the point P (and naturally on further points and objects belonging to this region).

As an FB tree in accordance with the invention is balanced exactly like a B tree with regard to height, the tree search and thus the locating of the point P can be performed in a time O($\log_k$ N).

One fundamental query type in all database systems is that of so-called area queries in which an interval is given with regard to every dimension. In this case, no interval data with regard to one dimension is interpreted as the interval (−infinite, +infinite). By means of the product of these intervals, an n-dimensional cuboid is determined which represents the query area. In the following, this query area is called query box q.

Figure 8:
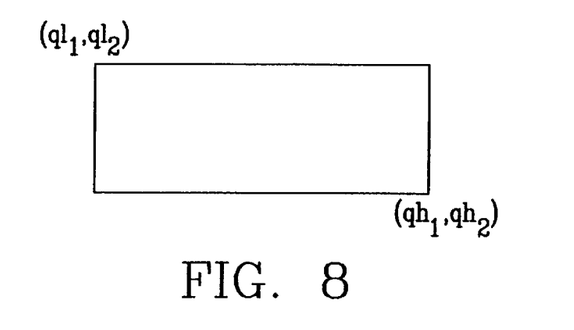
FIG. 8 shows a query area for the two-dimensional case.

FIG. 8 shows by way of example a query box q for the two-dimensional case in which the n-dimensional cuboid is a rectangle. The query range of the query box q shown in FIG. 8 is given by the values (ql$_1$, ql$_2$) for the lowest value (l for low) and (qh$_1$, qh$_2$) for the highest point (h for high).

The answer to an area query is the set of those points or objects which are within the query box q or intersect this.

In the general n-dimensional case, the query box is given by the 2*n values ql$_i$ and qh$_i$ where i=1, 2, . . . , n, where naturally in accordance with the example of FIG. 8 explained above ql$_i$<qh$_i$ applies (for the case ql$_i$=qh$_i$ for all i values, the special case of the point query which has already been treated is produced).

The smallest point of the query box q thus has the Cartesian coordinates (ql$_1$, ql$_2$, . . . , ql$_n$) and lies in an exactly defined region reg($\alpha_{j-1}$, $\alpha_j$). To locate this region, first the address $\lambda$=alpha (ql$_1$, ql$_2$, . . . , ql$_n$)

of the smallest point q is computed. This operation represents internal computations in the main memory which do not require any access operations in peripheral memories. The computation effort is negligibly small for this reason.

Then the region reg($\alpha_{j-1}$, $\alpha_j$) with the property $\alpha_{j-1} << \lambda << \alpha_j$ is determined. This requires a search in the FB tree with the effort O ($\log_k$ N). Here, O ($\log_k$N) disk access operations may also become necessary. The last page of this tree search is the page paged ($\alpha_{j-1}$, $\alpha_j$) which contains the identifiers of all data objects or the complete data objects themselves which are within or intersect the region reg($\alpha_{j-1}$, $\alpha_j$). For these data objects, an individual determination is now made as to whether they intersect the query box q or not. It should be noted that the data objects can only intersect q if their associated region intersects the query box q (this is a necessary, but not sufficient condition). Thus, first a part of the data objects is found in the query box q.

The region reg($\alpha_{j-1}$, $\alpha_j$) found is built up, as described above, of sub-cubes whose addresses are ordered. Here, the region reg(023, 101) of FIG. 7 should serve as an example, which region consists of the cubes 024, 04, 101 in that order. If any region intersects the query area, it is naturally not necessary for all sub-cubes of this region also to intersect the query area.

The address of the last sub-cube of the region reg($\alpha_{j-1}$, $\alpha_j$) which intersects the query area is assumed to be $\beta$. Furthermore, $\beta$ is assumed to have the form $\beta'$l, where l is the index of $\beta$ at the stage at which $\beta$ is located. For example, for the cube 024 of the region reg(023, 101) of FIG. 7 the relationship applies:

for 024 at stage 3, l=4.

$\beta$=024 can thus be represented in the form $\beta'$ where $\beta'$=02 and l=4 where the number of digits in the address representation gives the stage.

The same applies for the other cubes 04 and 101 contained in the given region reg (023, 101):

for 04 at stage 2, l=4 for 101 at stage 3, l=1.

It should be noted that l=0 cannot occur, as in accordance with the address structure in accordance with the invention no address can end in 0.

Figure 9:
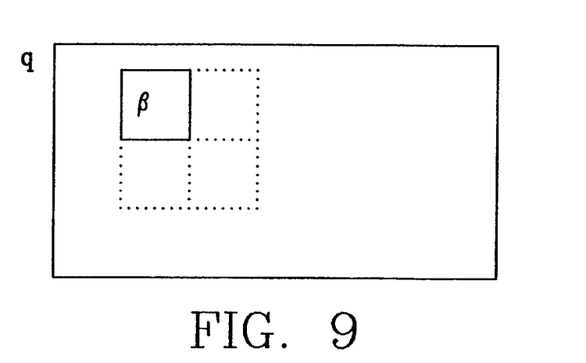
FIG. 9 shows the query area of FIG. 8 with a sub-cube in the query area.

After the region reg($\alpha_{j-1}$, $\alpha_j$) has been worked through in the area query as described above, now the next region has to be found which intersects the query area. For this purpose, the position of cube $\beta$ is considered in relation to the query box q and its next higher cube in which $\beta$ itself is contained. This is shown by way of example in the representation of FIG. 9 in which the query box q of FIG. 8 is shown with the cube $\beta$ within it, where the other cubes belonging to the next higher cube of the cube $\beta$ being shown in dots. These dotted sub-cubes of the same stage belonging to one and the same next higher cube are called brothers here. All sub-cubes of stage s of a next higher cube of stage s−1 are thus brothers. A sub-cube of the same stage s with a smaller index l is thus a smaller brother; a sub-cube of the same stage s with a bigger index l is thus a bigger brother. In the example shown in FIG. 7, the big brother of sub-cube 023 is the sub-cube 024, where these two brothers are not in the same region.

In the continuation of the area query, the next data objects which had previously not yet been found in the region reg($\alpha_{j-}$, $\alpha_j$), which had been worked through, and which are in the query box q, are thus contained in a bigger brother of $\beta$ or in the father of $\beta$ or in another predecessor of $\beta$.

Figure 10:
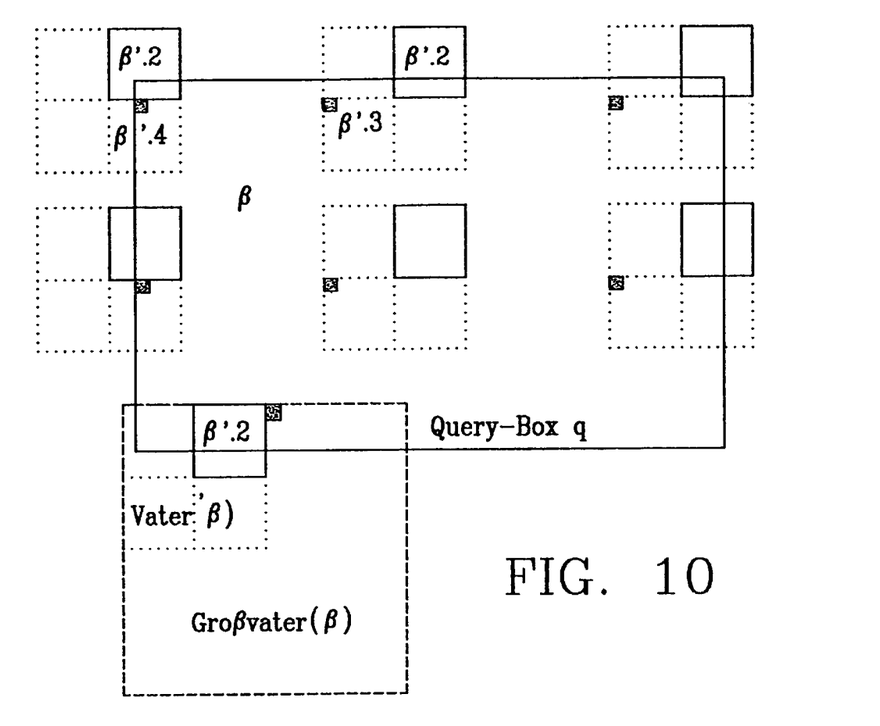
FIG. 10 shows the query area of FIGS. 8 and 9 with multiple sub-cubes lying in the query area and intersecting the query area.

FIG. 10 shows by way of example some possible situations for a cube of the form $\beta'$2 for the two-dimensional case.

If no bigger brother of the cube $\beta$ intersects the query box q (last case in FIG. 10), then the father of cube $\beta$ does not contain any more objects either which have not yet been found (by a previous working through of the smaller brothers), but which could lie in the query box q. For this reason, the bigger brothers of the father of the cube β must be investigated to see whether they intersect the query box q. If not, it will be necessary in accordance with an analog consideration to switch to the grandfather of the cube β and to check its bigger brothers for intersection with the query box q. In this way, finally the whole data universe will be covered and all objects in the query box q found.

It is to be noted: if the cube β is located at the stage s, then we can switch to the father s times at the most and check its bigger brothers (of which there are at most $2^n-1$) in each case for intersection with the query box q. Furthermore s<=ld(pix) and in the switch to the father node and in the check of the intersection of the bigger brothers in each case with the query box q, only internal main memory computations are performed; there are thus no input/output processes or disk access operations required. For this reason, this method of finding the next cube which intersects the query box q is extremely fast and can be neglected in the balance for the total time in the answering of an area query.

As soon as, in accordance with this method, the first cube is determined which intersects the query box q, the Cartesian coordinates of the smallest pixel in intersection with the query box q (in FIG. 10 the small black squares) are computed, these being produced as follows:

Let one cube have with regard to its dimension i the extension of $xl_i$ (smallest coordinate) to $xh_i$ (biggest coordinate) based on the designations for the values ql or qh.

The condition for this cube not intersecting query box q is:

there exist: i: $xh_i<ql_i$ or $xl_i>qh_i$

The condition for this cube intersecting query box q is the negation of the above formula:

not there exist: i: $xh_i<ql_i$ or $xl_i>qh_i$ or, according to the laws of mathematical logic:

for all i: $xh_i>ql_i$ and $xl_i<qh_i$

Then the coordinates of the smallest intersection point sp with the query box q is produced as follows with regard to the ith dimension:

if $xl_i>=ql_i$ then $sp_i:=xl_i$ else $sp_i:=ql_i$

The point of intersection sp then has the Cartesian coordinates $sp=(sp_1, sp_2, \ldots sp_n)$ and its address is:

sigma:=alpha $(sp_1, sp_2, \ldots sp_n)$.

It should be noted that up to this step, our method to determine sp did not require any input/output procedures or any disk access operations.

To find the clear region belonging to the point of intersection sp, a point query is now required with the address sigma, exactly as was already described above. It requires a time effort of the order $O(\log_k N)$, as also analysed above.

However, it now follows from this that in answering an area query processing costs are only incurred for those regions which actually intersect the query box q. For each such region, the costs are of the order $O(\log_k N)$, a total therefore of $r*0 (\log_k N)$ when r regions intersect the query box q.

Below, the method of answering area queries is given for an n-dimensional query box q with coordinates $ql_i$ and $qh_i$ for i=1,2, . . . , n:

Initialize:

```
sigma := alpha (ql₁, ql₂, . . ., qlₙ);
RegionLoop: begin co for each region which intersects q oc
    find by tree search in the FB tree the reg(αⱼ₋₁, αⱼ),
    in which sigma lies, i.e. where αⱼ₋₁<<sigma<<=αⱼ;
    get page page (αⱼ₋₁, αⱼ);
    ObjectLoop:    begin for all objects Q on page page (αⱼ₋₁, αⱼ)
check:
        if Q intersects q then output Q as part of the answer
    end ObjectLoop;
    find last sub-cube with address β of reg(αⱼ₋₁, αⱼ),
        so that sub-cube (β) intersects q;
    if (qh₁, qh₂, . . ., qhₙ) contained in sub-cube (β)
    then co finished oc goto Exit
else
    FatherLoop: begin co β have the form β = B'.i oc
        i: tail (β);
        BrotherLoop: for k: = i+1 to 2ⁿ
            do if sub-cube (β'.k) intersects q then
                begin sp : = smallest intersection with q:
                    sigma := alpha (sp);
                    goto RegionLoop
                        co loop is safely left here
                        because q is not yet worked through oc
                end
            od co for all bigger brothers of β intersection with q is
empty oc;
        β: = father (β);
        goto FatherLoop
    end FatherLoop;
end RegionLoop;
Exit: co end of program oc
```

Below, the method in accordance with the invention is described by means of the organization of generally extended objects.

Figure 11:
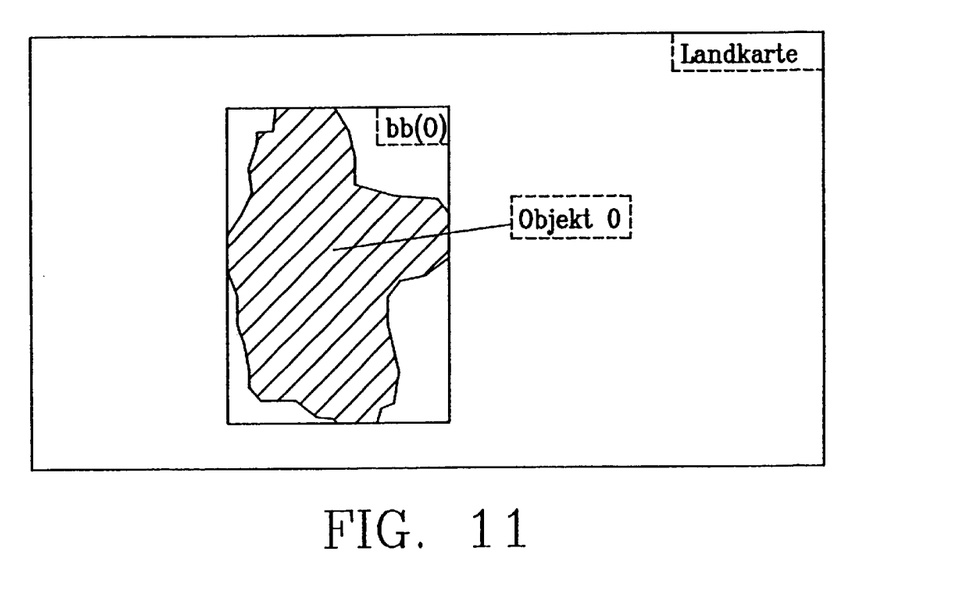
FIG. 11 shows a data set by way of the example of an extended object.

A generally extended object is one important case of a data object. Here, it is, for example, a question of a lake in a geographical map as is shown in FIG. 11.

The extended object O is surrounded first by an axis-parallel cuboid corresponding to the dimension, which cuboid is selected in its dimensions so small that it just surrounds the extended object. In the example of FIG. 11, this is shown by means of the lake and a two-dimensional cuboid bb (=rectangle) just surrounding the lake shown there. In the literature, the cuboid surrounding the extended object is termed the bounding box.

For an extended object, only the identifier Id(O) is stored in the FB tree, with said storing of the identifier actually being performed several times, said is for each region intersecting the extended object. The extended object itself is stored remotely from the FB-tree in another memory sector or in a database.

The bounding box for an extended object O is designated here with bb(O). The identifier Id(O) for the extended object O is now stored in the FB tree with each region which intersects the extended object O. Here, it should be noted that the extended object O can only intersect those regions which are also intersected by the bounding box bb. This is a necessary condition, but not a sufficient one, which is used to accelerate substantially the algorithms to implement the method in accordance with the invention.

When inserting a general extended object O, first the associated bounding box bb(O) is computed. Then the following method is performed:

for all regions R which intersect bb(O) do
    if R intersects O then insert Id(O) into R
        co this can naturally lead to a—generally even to
            multiple—splittings
        of R oc Note: To find the regions R which intersect bb(O), bb(O) is treated exactly like a query box q. This leads to the following detailed process:
Initialize:

```
        Compute bb(O):
            q:= bb(O)
        sigma := alpha (ql₁, ql₂, . . ., qlₙ);
RegionLoop: begin co for each region which intersects q oc
        find by tree search in the FB tree the reg(α_{j-1}, α_j),
            in which sigma lies, i.e. where α_{j-1}<<sigma<<=α_j;
            get page page (α_{j-1}, α_j);
        if O intersects R then insert ID(O) into R, i.e.:
        if number of objects intersecting R is <= M
            then save ID(O) on page(α_{j-1}, α_j)
            else split R and page(α_{j-1}, α_j)
            as described above to split regions and pages;
        find last sub-cube with address β of reg(α_{j-1}, α_j),
            so that sub-cube (β) intersects q;
        if (qh₁, qh₂, . . ., qhₙ) contained in sub-cube (β)
        then co finished oc goto Exit else
        FatherLoop: begin co β have the form β = β'.i oc
            i: tail (β);
            BrotherLoop: for k: = i+1 to 2ⁿ
                do if sub-cube (β'.k) intersects q then
                    begin sp := smallest intersection with q:
                        sigma := alpha (sp);
                        goto RegionLoop
                            co loop is safely left here
                            because q is not yet worked through oc
                    end
                od co for all bigger brothers of β intersection with
                    q is empty oc;
            β: = father (β);
            goto FatherLoop
        end FatherLoop;
end RegionLoop;
Exit: co end of program oc
```

To delete an extended object O, a bounding box bb(O) is again used to find all regions which could intersect O. The identifier ID(O) is contained in the regions and stored on the associated pages which actually intersect the extended object (O) and is deleted from this. Here, merging of regions and associated pages can again occur as was already described above.

The database system in accordance with the invention and the methods in accordance with the intention to organize multidimensional data thus allow a fast and secure access to data of a multidimensional data set with the data structure in accordance with the invention allowing in particular a dynamic addition to or modification of the multidimensional data set. In accordance with the invention, only the modification of a single tree is necessary for the insertion or deletion of objects.

In answering queries, the FB tree method in accordance with the invention shows the following performance characteristic: for this purpose we assume that $p_i\%$ of the values of the data set lie with regard to the ith dimension in the query interval $[ql_i:qh_i]$ of the query box q, then $(p_1\% * p_2\% * \ldots * p_n\%) *N$ objects lie in the query box q. As not all regions which intersect q lie completely within q, but can extend out of it, generally more objects must be fetched from the peripheral memory than lie in the query box. On average, however, these are less than twice as many objects as lie in q, i.e. $2*(p_1\% * p_2\% * \ldots * p_n\%) *N$ objects.

We therefore have a multiplying rather than an additive process (as in the methods known from the prior art) of fractions of N, which leads to clear improvements. This is illustrated by means of a simple computation example:

| Let | $p_1 = 2\%$ | $p_2 = 5\%$, | $p_3 = 4\%$ | $p_4 = 10\%$ |
|---|---|---|---|---|
| then | sum of $p_i = 21\% = 21*10^{-2}$ | | | |
| and | product of $p_i = 400*10^{-8} = 4*10^{-6}$ | | | |

If the total data universe observed contains 10,000,000 objects—for typical database applications a realistic, rather small data universe—then in the prior art, 2,100,000 objects have to be fetched from the peripheral memory; but with the new method of FB trees only $2*10^7*4*10^{-6}=80$ objects, an improvement by around the factor of 2,500 over the known prior art.

Naturally, the present invention is not restricted to the embodiments described, but other embodiments are possible which are within the scope of one skilled in the art. For example, the type of numbering of the sub-cubes and the structure of the addresses of sub-cubes and regions is thus also possible in other ways without leaving the scope of the invention.

I claim:

1. A database system, comprising:

a computing device, a main memory for indexing and storing a data set lying in a multidimensional cube, said main memory having memory pages of given storage capacity, said multidimensional cube being repeatedly divided iteratively into sub-cubes in all dimensions until successive sub-cubes can be collected together to regions which each contains a set of data objects which can be stored on one of the memory pages.

2. A database system in accordance with claim 1, wherein the storing of the data objects of a region is performed on a memory page under allocation of a pointer to the memory page and an address designating the region boundaries.

3. A database system in accordance with claim 2, wherein the storage of the pointer and the address is done in one of a B tree, a B* tree or a prefix B tree.

4. A database system in accordance with claim 3, wherein the storage of the data objects is done on leaf pages of one of the B tree, B* tree or prefix B tree.

5. A database system in accordance with claim 2, wherein the address designating the region boundaries consists of data on the last of the sub-cubes forming the region.

6. A database system in accordance with claim 5, wherein the address comprises data on the number of sub-cubes contained at each division stage in the region.

7. A database system in accordance with claim 5, wherein the address comprises a sequence of numbers allocated to the last sub-cube in each case in the corresponding division stage still fully enclosed by the region.

8. A method for organizing an n-dimensional data set on memory pages of a storage device of given storage capacity, wherein the data set lies in a multidimensional cube, comprising:

a) repeatedly dividing iteratively the multidimensional cube in all dimensions into sub-cubes until successive sub-cubes can be collected together to regions which each contains a set of data objects which can be stored on one of the memory pages of the storage device, and b) indexing and storing the data set on the memory pages of the storage device.

9. A method in accordance with claim 8, wherein the indexing and storing of the data set on the memory pages comprises:

a) forming a starting region consisting of a total cube;

b) counting the data objects existing in the starting region;

c) storing the data objects of the starting region on a memory page, if the number of data objects of the starting region is not greater than the number of data objects corresponding to the given storage capacity of a memory page;

d) otherwise, selecting a splitting address for the starting region in such a way that by splitting the starting region along the splitting address a first and a second partial region are created in which in each case around half the data objects of the starting region are contained;

e) continuing the method from step b), with the first partial region taking on the role of the starting region;

f) continuing the method from step b), with the second partial region taking on the role of the starting region;

g) repeating steps e) and f) in each case until the partial regions created in step d) each contains a set of data objects which can be stored on one of the memory pages of given storage capacity.

10. A method in accordance with claim 9, wherein the storing in accordance with step c) is performed with parallel storing of an address allocated to the corresponding region and a pointer allocated to the address and referring to the memory page on which the data objects stored in accordance with step c) are contained.

11. A method in accordance with claim 10, wherein the storing of the address and the pointer is done in one of a B tree, B* tree or prefix B tree, with regions being defined in each case by successive addresses, the data objects of which regions are stored in each case on a memory page of given storage capacity.

12. A method for insertion of data objects into an n-dimensional data set with n>1 divided into regions and stored on memory pages of given storage capacity of a storage device, comprising:

a) determining a region of the n-dimensional data set associated with the data object to be inserted from the coordinates of the data object in the n-dimensional space;

b) locating the memory page on which this region is stored;

c) determining the number of the data objects stored on this memory page;

d) storing the data object on this memory page if the number of data objects stored is smaller than the number corresponding to the given storage capacity of the memory page;

e) otherwise, selecting a splitting address for the region stored on this memory page in such a way that by splitting the region along the splitting address, a first and a second partial region are generated in which in each case less than roughly half of the number of data objects corresponding to the given storage capacity is contained;

f) inserting the data object in that partial region in which the coordinates of the data object lie;

g) storing the first and second partial regions on one memory page in each case.

13. A method in accordance with claim 12, wherein the locating of the memory page in accordance with step b) is performed by means of addresses and pointers stored in one of a B tree, a B* tree or a prefix B tree and allocated to the memory pages.

14. A method in accordance with claim 13, wherein the storage of the first and second partial regions in accordance with g) is performed while replacing the pointer and address of the region from step b) by the addresses and pointers allocated in each case to the first and second partial regions.

15. A method in accordance with claim 14, wherein the storage of the address and the pointer is done in one of a B tree, B* tree or prefix B tree, with regions being defined by successive addresses in each case, the data objects of which regions are stored in each case on a memory page of given storage capacity.

16. A method for deletion of data objects in an n-dimensional data set divided into regions and stored on memory pages of given storage capacity of a memory device, comprising:

a) determining a region of the n-dimensional data set associated with the data object to be deleted from the coordinates of the data object in the n-dimensional space;

b) locating the memory page on which this region is stored;

c) deleting the data object on this memory page;

d) determining the number of data objects stored on this memory page;

e) merging the region with one of its two neighboring regions if the number of stored data objects is smaller than around half of the number corresponding to the given storage capacity of the memory page;

f) determining the number of the data objects in the region newly created by the merger;

g) storing the region on one memory page if the number of data objects existing in the region is not greater than the number corresponding to the given storage capacity of the memory page;

h) otherwise, selecting a splitting address for the region in such a way that by splitting along the splitting address, a first partial region and a second partial region are generated which each contain roughly half of the data objects determined in accordance with step f) and storage of the partial regions on one memory page in each case.

17. A method in accordance with claim 16, wherein the location of the memory page in accordance with step b) is performed by means of addresses and pointers stored in one of a B tree, B* tree or prefix B tree and allocated to the memory pages.

18. A method for performing a data query on the basis of a given n-dimensional query area in an n-dimensional data set divided into regions compiled from sub-cubes and stored on memory pages of given storage capacity of a memory device, comprising:

a) determining the coordinates of the lowest and highest point of intersection of the query area with the n-dimensional data set;

b) determining that region in which lies the lowest point of intersection and location of that memory page on which this region is stored;

c) determining all data objects stored on this memory page which form an intersection set with the query area and output of the data objects determined;

d) determining the last sub-cube in the succession of the region determined in step b), which sub-cube intersects the query area;

e) ending the data query if the highest point of intersection lies in this sub-cube;

f) otherwise, determining the next sub-cube of the same plane and the same next higher cube which intersects the query area;

g) determining the coordinates of the lowest point of intersection of the query area with the sub-cube determined and continuation of the method at step b) if a sub-cube was determined in step f);

h) otherwise, determining the next sub-cube of the plane of the next higher cube from step f) which intersects the query area and performance of step f) with the sub-cubes of the cube determined;

i) continuing the method with step f) if in step h) no sub-cube of the plane of the next higher cube from step f) is determined, with the next higher cube taking over the role of the sub-cube.

* * * * *